Oct. 7, 1952 — G. A. LYON — 2,612,656
METHOD OF AND APPARATUS FOR MAKING PLASTIC TUBING
Filed Aug. 13, 1949 — 2 SHEETS—SHEET 1
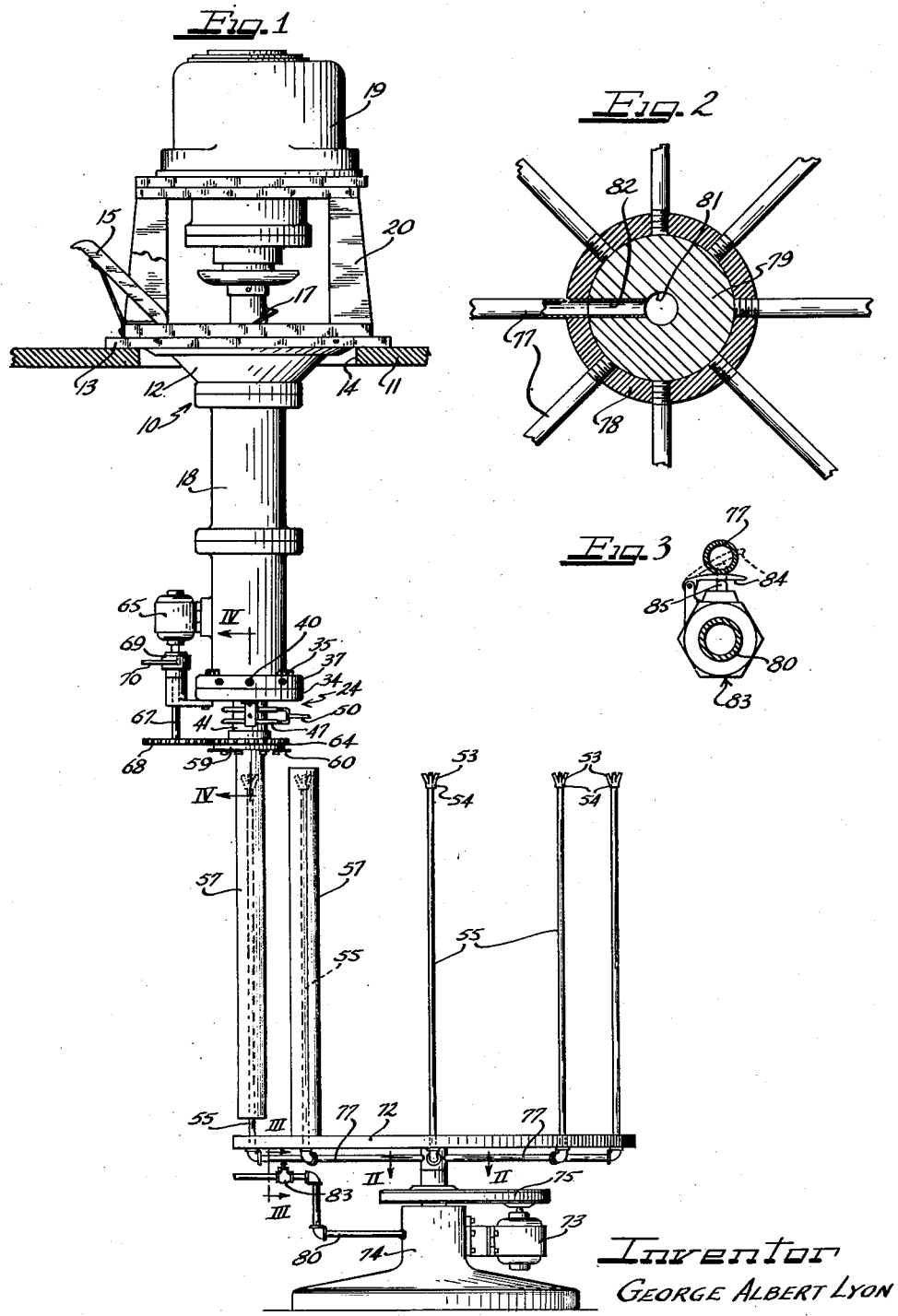
Inventor
GEORGE ALBERT LYON

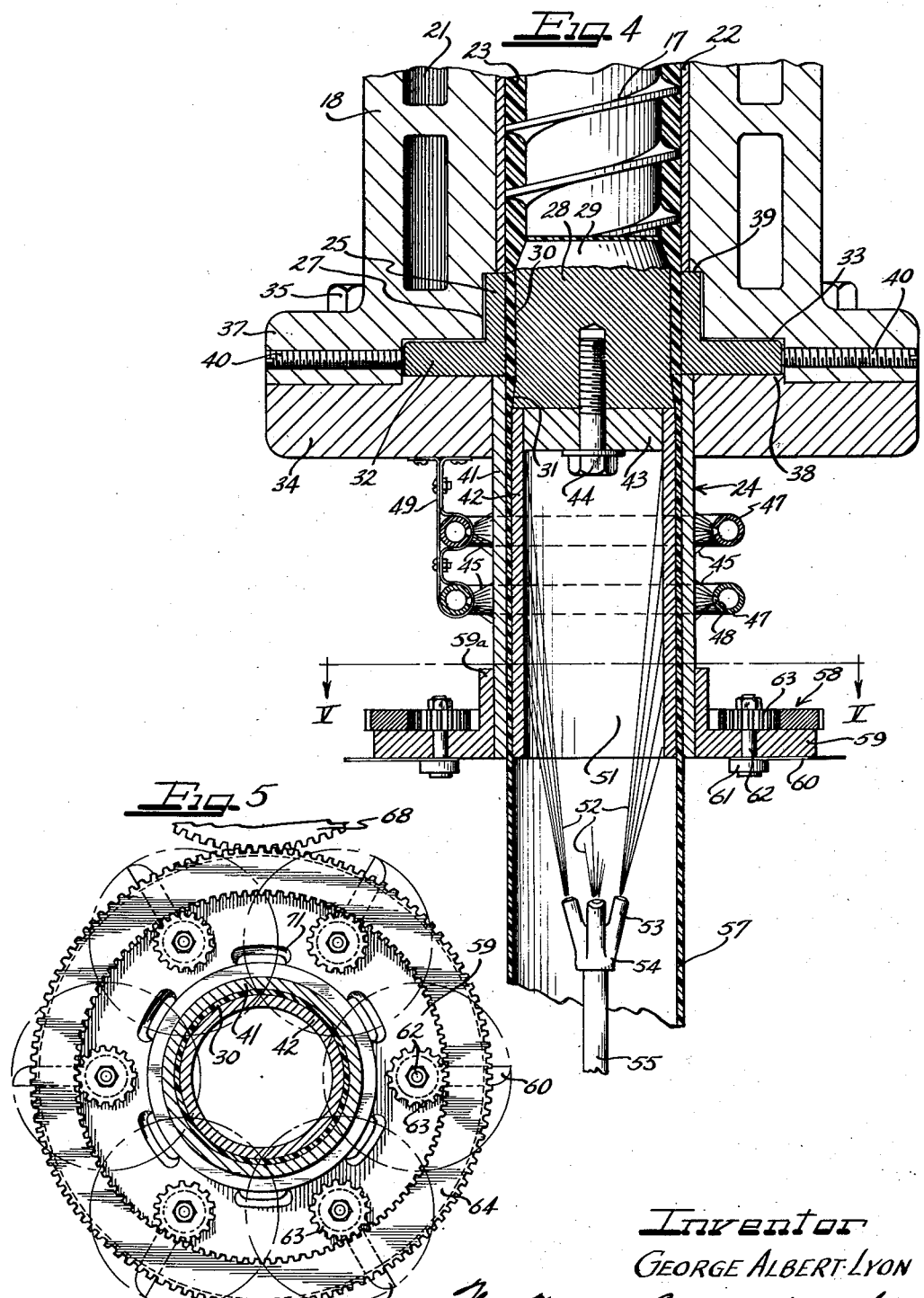

Patented Oct. 7, 1952

2,612,656

UNITED STATES PATENT OFFICE 2,612,656

METHOD OF AND APPARATUS FOR MAKING PLASTIC TUBING

George Albert Lyon, Detroit, Mich.

Application August 13, 1949, Serial No. 110,091

18 Claims. (Cl. 18—14)

1

The present invention relates to improvements in the manufacture of tubing from thermoplastic material and more particularly concerns a method of and apparatus for the continuous production of such tubing.

An important object of the present invention is to provide an improved method of and apparatus for the continuous production of tubing from thermoplastic material.

Another object of the invention is to provide an improved method of and apparatus for the continuous production of tubular sections of predetermined length from thermoplastic material.

A further object of the invention is to provide an improved method of and apparatus for extruding tubing from thermoplastic material and resulting in tubing of improved accuracy of proportions.

Still another object of the invention is to provide improved means for producing tubing from thermoplastic material and severed into lengths having accurately sheared ends.

Yet another object of the invention is to provide means for producing and handling tubing made from thermoplastic material.

According to the general features of the present invention there is provided an improved method of making tubing from thermoplastic material, which comprises extruding material in thermoplastic state through a tube-forming die having a tube-forming passage of substantial length, in the first portion of the tube-forming passage accommodating the material in thermoplastic condition, and in the final portion of the tube-forming passage cooling the formed tubing to substantially set condition so that the tubing emerges from the forming die in shape-retaining form.

According to other general features of the invention there is provided a method of making tubing from thermoplastic material which comprises extruding material in thermoplastic condition through a fixed forming die, continuously cooling the forming die to set the thermoplastic material therein, extruding the set thermoplastic material from the die to substantial length, and severing the tubing into a section of tubing at the extrusion outlet of the nozzle.

According to yet other general features of the invention there is provided in plastic tubing forming apparatus, means for extruding material in thermoplastic form including an extrusion die having an elongated cylindrical extrusion passage, and means for cooling the discharge end portion of the extrusion die to substantially set the tubing prior to leaving the extrusion die.

2

According to other features of the invention means are provided at the exit of the extrusion die for cleanly shearing the extruded tubing into sections.

According to yet other features of the invention means are provided for receiving the sheared sections of tubing and arranged to convey the tubing sections away from the extrusion point for further cooling.

Other objects, features and advantages of the present invention will be readily apparent from the following detailed description of a preferred embodiment of the invention taken in conjunction with the accompanying drawings, in which:

Figure 1 is an elevational view of a plastic tubing forming apparatus embodying the features of the present invention;

Figure 2 is a fragmentary horizontal sectional view taken substantially on the line II—II of Figure 1;

Figure 3 is an enlarged vertical sectional detail view taken substantially on the line III—III of Figure 1;

Figure 4 is an enlarged vertical sectional detail view through the extruding die assembly and associated mechanism taken substantially on the line IV—IV of Figure 1; and Figure 5 is a horizontal sectional detail view taken substantially on the line V—V of Figure 4.

As shown on the drawings:

Apparatus is provided for practicing the method which includes plasticizing thermoplastic material such, for example, as ethyl cellulose, cellulose acetate, vinyl resins, etc. The thermoplastic material is worked and forced through a forming die having a tube-forming passage. As the formed thermoplastic material is forced on through the die, it is cooled and substantially set while in continuous movement and is then extruded in substantially set condition as a tube of substantially uniform wall dimensions. After a predetermined length of the formed tube has been extruded, it is cut off cleanly at the point of extrusion to form a tubular section of given length.

Throughout a substantial portion of its final length, the forming and extrusion die is hollow and cooling water is sprayed thereinto for effecting the setting of the formed tube therein and the cooling water runs from the hollow die into the formed plastic tube beyond the extrusion point. As each section of tubing is severed, it is carried away from the point of extrusion and drained and further cooled for subsequent handling.

The apparatus is of compact, efficient construction and arrangement and is adapted for the continuous production of plastic tubing. To this end, the apparatus includes a plasticizing and working unit 10 for thermoplastic material preferably disposed in vertical position and fixedly supported by supporting means 11 which may comprise the floor of a building, since a plastic tube forming machine of the type contemplated herein may be as much as two stories in height.

Accordingly, the unit 10 includes a hopper 12 supported on the floor 11 by means such as a flange 13 and depending through an appropriate aperture 14 in the floor. Plastic material in granular form may be dumped into the hopper 12 by way of a chute 15. From the hopper the granular thermoplastic material is worked downwardly by a spiral screw 17 into a hollow cylindrical plasticizing and working housing 18. Means for operating the screw 17 may comprise a motor 19 and appropriate gearing supported by appropriate framework 20 above the hopper 12.

As best seen in Figure 4, the lasticizing and working housing 18 is provided with a hot water or steam jacket 21 by which the vertical working passage therein having a liner 22 is heated to the temperature at which plastic material 23 is rendered thermoplastic. As the material is plasticized it is also worked to a smooth and uniform consistency by the screw 17 and forced downwardly in the plasticizing and working chamber.

From the lower end of the casing 18, the thermoplastic material is forced by the screw 17 into and through a tube forming die assembly 24 supported by the lower end portion of the casing. This die assembly includes a spider member 25 which is accommodated within a recess 27 in the lower end of the casing 18 and has a central core portion 28 opposing the lower end of the working and plastic material driving screw 17. As the thermoplastic material 23 is forced through the spider 25 it is gradually shaped into the tubular form ultimately desired. For this purpose, the core 28 includes a tapered head 29 which deflects the plastic material outwardly to a thinner section defined by the remainder of the core which may be gradually tapered to the ultimate internal diameter of the plastic tube but is preferably formed cylindrical as shown at 30 throughout the major portion of its length and then has a lower radially flaring terminal section 31 having as its maximum diameter the ultimate internal diameter of the finished plastic tubing. The outer wall of the spider encircling the core 28 is preferably formed on the ultimate outside diameter of the plastic tubing.

Since for the attainment of uniform plastic pressure through the spider 25, it is highly desirable to have the core 28 concentric with the screw 17, means are provided for effecting accurate adjustment in assembly of the spider. To this end, the spider 25 is provided with a lateral flange 32 accommodated within a counterbore 33, both the body of the spider and the flange 32 being accommodated loosely for transverse adjustment within the recess 27 and counterbore 33. A clamping plate 34 secured as by means of screws 35 to a lateral flange 37 at the lower end of the casing 18, clamps the spider 25 axially into position. For this purpose the clamping plate 34 has a centering boss 36 extending into the counterbore 33 and bearing against the spider flange 32 to drive the upper end of the spider against a shoulder 39 at the upper end of the recess 27. By reason of the lateral clearance afforded about the spider 25, it is adapted to be adjusted for concentricity by means of a uniformly arranged series of set screws 40 threaded horizontally through the flange 37 into engagement with the edge of the spider flange 32.

Cooperating in plastic tube forming relation with the lower end of the spider 25 are die means including an outer die tube 41 and an inner die tube 42. The outer die tube 41 extends coaxially through and is carried by the clamping plate 34 and has the upper end portion thereof concentrically cooperating with the terminal tapered portion 31 of the spider core. The inner die tube 42 is carried by an attachment plug 43 and is secured concentrically as by means of a screw 44 extending through the attachment plug to the lower end of the spider core 28. The inside diameter of the outer die tube 41 corresponds to the ultimate or finished diameter of the plastic tube and the outside diameter of the inner forming or die tube 42 corresponds to the desired finished inside diameter of the plastic tube. When the spider 25 is adjusted to concentricity with the screw 17, concentricity of the inner die forming tube 42 with the outer die forming tube 41 is also attained. Thus, the thermoplastic material 23 is forced smoothly and uniformly and with uniform pressure into and through the tubular forming passage in the die assembly 24 provided by the spider and the concentric die forming tubes 41 and 42.

Not only is the tube forming passage in the die assembly 24 long enough for accurate, homogeneous tube wall formation, but also long enough to enable substantial setting of the thermoplastic material of the formed tube, so that at the point of extrusion, the tube is solid enough to be self-sustaining as to form. To this end, the die tubes 41 and 42 extend downwardly coextensively a distance which is substantially in excess of minimum tube-forming requirements, in the present instance extending substantially beyond the lower face of the clamping plate 34 and thus affording elongated relatively thin wall radiator surfaces which may be exposed for cooling and which are preferably positively cooled so as to set the plastic material of the tubing. Although the radiator section of the forming tubes may be externally cooled by a cooling jacket through which a coolant fluid is circulated, a simple, efficient expedient comprises directing coolant such as cold water in the form of jets or sprays 45 against the outer cylindrical periphery of the outer radiator section provided by the outer tube 41. One or more, in the present instance shown as a pair of circular tubular spray heads or rings 47 having inwardly directed spray ports 48 and concentrically encircling the outer tube 41 may be provided to direct the sprays 45. The spray rings are mounted in superposed spaced relation by means such as one or more brackets 49 secured to the underside of the clamping plate 34. Coolant is supplied to the spray rings from any suitable source under appropriate pressure through a supply duct system 50.

More rapid and uniform cooling results are attained by effecting cooling at the inside of the formed plastic tube as well as at the outside. For this purpose, the interior of the inner radiator section provided by the inner die tube 42 is also subjected to positive cooling and conveniently affords a cooling chamber 51 into which a plurality of jets or sprays 52 of coolant fluid such as water are directed. Means for producing the coolant sprays 52 efficiently comprise a plurality of appropriately dimensioned nozzles 53 which may form integral parts of a spray head 54 disposed substantially concentrically below the chamber 51 and carried by a coolant supply tube 55 affording a standard projecting upwardly into the newly formed, substantially set plastic tubing, identified at 57, following extrusion thereof.

It will thus be evident that the extruded tubing 57 is not only quite accurately formed as to wall thickness and concentricity in the forming die assembly 24, but the substantial accuracy in these desirable dimensions and proportions are positively maintained in the extruded tubing by reason of the fact that the tubing is substantially set and self-sustaining as to form prior to extrusion. In order to reduce friction of the substantially set tubing in the lower portion of the tubing passage in the radiator section of the tubes 41 and 42, a suitable lubricant may be introduced into the plastic mix or a lubricant may be introduced into the radiator portion of the tube passageway in any preferred or known manner. However, it should be understood that by the use of coolant sprays cooling in the radiator section of the tube forming die assembly occurs gradually so that there is no excessive or sudden chilling of the plastic such as might cause crazing, cracking or distortion of the tube surface. The length of the radiator section is properly proportioned with respect to the speed of operation and the thermoplastic temperature of the plastic material so that actual setting of the plastic material of the formed tubing occurs fairly close to the point of extrusion from the die assembly. This means that the plastic material of the tubing gradually cools and congeals from the thermoplastic to the set condition thereof substantially throughout travel through the radiator section but at the point of exrusion and for some indefinite short distance prior to the point of extrusion is set to the desired form sustaining condition. This does not necessarily mean that the material has attained full hardness or what may be termed the fully cured condition at the point of extrusion but at this point the material will resist ordinary deforming factors and will still be in a substantially warm or even hot condition below the temperature at which it was thermoplastic.

To facilitate handling, the finished plastic tubing 57 is cut into sections of preferred length. By the present invention means are provided for sectioning the tubing substantially as part of the forming process. That is, the tubing is cut into sections at the extrusion end of the forming and extruding die assembly 24 without pause in the continuous forming process. As a matter of fact, the extrusion ends of the die tubes 41 and 42 are utilized as part of the tube severing mechanism. To this end, tube severance means 58 is provided in association with the lower end of the forming die tube assembly and comprises a horizontal annular supporting flange 59 having a hub 59a secured to the outer side of the lower end portion of the die tube 41 and preferably with the lower face of the flange 59 coplanar with the coterminus lower ends of the tubes 41 and 42.

Operatively supported by the carrying flange 59 is a set of tube severance knife blades 60. Each of the blades 60 is carried by a hub 61 secured to a vertical shaft 62 appropriately journaled in the flange 59 and carrying on its upper end above the flange 59 a spur gear 63 forming part of a gear assembly including a ring gear 64 drivingly meshing with the spur gears 63. As best seen in Figure 5, the knife shafts and spur gears 63 are equidistantly spaced around the supporting flange 59 and the spacing between knife assemblies is such that the shortest practicable blades 60 may be used to cooperate in overlapping strokes in operation, as indicated by the circular knife sweep indicating dot-dash lines in Figure 5, for simultaneous severance action upon the formed and set plastic tube.

For periodically driving ring gear 64 as desired to sever a section of plastic tubing 57, means are provided such as an electric motor 65 which may be carried by the lower section of the extruder casing 18 (Figure 1) and drives a shaft 67 carrying a drive gear 68 meshing with the ring gear 64. By preference a clutch assembly 69 is interposed between the shaft of the motor 65 and the drive shaft 67 and an operating handle 70 is adapted to be manipulated to operate the clutch for selective actuation of the knife actuating gear assembly. By preference the clutch 69 is a one revolution clutch which automatically throws out after each revolution. Thus, when the clutch 69 is manipulated to actuate the knife gearing, the gearing is operated at high speed to rotate the knife shaft 63 in unison and substantially whip the knife blades 60 through their cutting sweeps and in which each of the blades, cooperating with the ends of the tubes 41 and 42 shears through a small arc of the plastic tube 57 at the point of extrusion, with each of the severance arcs overlapping at its ends with the adjacent severance arcs so that the tube is cleanly and virtually instantaneously severed on a uniform horizontal, square plane. High speed in the cutting operation is essential if the tube forming process is to be continuous, as is preferred. The desired high speed is attained by the multiplicity of overlapping sweep, relatively short knife blades each simultaneously cutting but a small arc of the formed tube in a cutting sweep or stroke that is faster than the rate of advancing movement of the newly formed tubing. Since the tubing is still hot and thus not fully hardened or brittle, although sufficiently set to be form sustaining, and the ends of the tubes 41 and 42 cooperate substantially as shearing blocks with the cutoff blades 60 a clean, square cut or shear of the tube end is accomplished.

While the plastic tubing 57 is being extruded from the die assembly 24, spent coolant from the coolant streams 45 may be directed against the exterior of the tubing through drain holes 71 in the knife supporting flange 59 (Figure 5) for additional cooling of the tubing. In addition, spent coolant from the coolant streams 52 may run down the interior of the formed tubing and assist in continued cooling of the tubing. As each section of tubing 57 is severed, it is desirable to convey the same away from the extruder in an upright position for drainage of coolant therefrom and for further cooling before stock piling or other disposition of the tube sections. For this purpose, means are provided by the present invention comprising a conveyor preferably in the form of a turntable 72 onto which each of the tube sections 57 will drop endwise upon severance and be conveyed in an upright position away from the extruder. Convenient means for retaining the plastic tube sections against tipping off of the turntable 72 comprises a series of the coolant supply pipe standards 55 which for this purpose are mounted at suitable intervals about the periphery of the turntable 72 and with the turntable so located that each of the dual purpose pipe standards 55 can be brought successively into substantially concentric registration below the extruder. The height of each of the pipe standards 55 and more specially the overall height thereof including the tri-nozzle spray head 54 thereon is such that sufficient clearance is afforded below the extruding end of the extruder die assembly 24 to enable movement of a severed tube section away and registration of a succeeding one of the pipe standards under the extruder before the advancing end of a succeeding portion of the plastic tube being formed drops below the elevation of the top of the standard to be received therein. After the tube has descended to sufficient length about the associated standard the tube section is severed just before the lower end reaches the turntable 72 and drops down by gravity clear of the continuing advancing end of the next succeeding section, the turntable 72 being promptly turned incrementally to bring the next succeeding pipe standard into tube receiving position.

Means for turning the turntable 72 may comprise an electric motor 73 supported below the turntable 72 on a turntable carrying pedestal 74, appropriate means such as belt and pulley drive 75 being provided for turning of the turntable by the motor 73. Of course, suitable means such as synchronous electrical control or mechanical control means (not shown) and which are well known in numerous applications in the practical arts may be utilized either separately from or in conjunction with the control means for the cutoff assembly 58 for controlling the turntable operation.

A coolant may be supplied to each of the coolant supply and tube retaining pipe standards 55 through a delivery duct 77 radiating from a sleeve or collar 78 concentrically in each of the turntables 72 and slidably encircling a bearing post or boss 79 arising from the pedestal 74. Coolant fluid is conducted from a suitable source by way of a conduit 80 into the pedestal 74 and passes up through a bore 81 in the boss 79 and a lateral outlet port or passage 82 into each of the delivery ducts 77 as the latter is brought into registration with the outlet port 82 by rotation of the turntable 72 and as the respective supply pipe standard 55 thus brought into registration assumes operative position beneath the extruder.

While a mere movement of the delivery ducts 77 into and out of registration with the supply port 82 may be relied upon to turn on and shut off the coolant from the respective coolant supply standards, positive valve control means may be supplied for the purpose. One convenient form of such control valve comprises a valve assembly 83 (Figures 1 and 3) interposed in the coolant source duct 80 and appropriately placed so that as each of the coolant supply pipes 55 comes into registration with the extruder a pivoted lever 84 is pressed down by the delivery pipe 77 of such coolant supply pipe to depress a valve opening button 85. In the intervals while the turntable is in motion to transport a finished tube section away from the extruder and a succeeding coolant supply and tubing retaining pipe standard is being moved into position, the valve controlling button 85 automatically pops up to the dash line position shown in Figure 3 and thus cuts off the coolant supply until the succeeding coolant delivery duct 77 depresses the control lever 84 and the control duct 85.

From the foregoing it will be apparent that the present invention defines a novel continuous plastic tube forming process and apparatus and cyclically operable means for severing the formed plastic tubing into sections or lengths, as well as other cyclically operable means for conveying the formed sections away from the extrusion point. It will also be apparent that the process and apparatus are well suited for manufacturing plastic tubing in a large variety of sizes either as to diameter or length.

I claim as my invention:

1. In a method of making tubing from thermoplastic material, driving thermoplastic material into a tube-forming die, directing streams of coolant against the die, cooling the die to set the material, and extruding the material from the die in set tubular form.

2. In a method of making plastic tubing, forcing thermoplastic material into an elongated tubular tube-forming die passageway, directing streams of coolant against the interior and the exterior surfaces of the die, gradually cooling the formed material in said passageway, and extruding the formed material in set condition from the passageway.

3. In the manufacture of plastic tubing, driving thermoplastic material into and through a downwardly directed forming die having an elongated tube-forming passage, internally and externally cooling the forming die by directing streams of liquid coolant thereagainst to cool and set the thermoplastic material in the die passage, extruding the set material in tubular form from said die passage, and continuing the cooling of the plastic tubing by running the spent cooling liquid downwardly thereover.

4. In plastic tubing forming apparatus, means for extruding material in thermoplastic form including an extrusion die having an elongated cylindrical extrusion passage, and means for directing streams of coolant against the die for cooling the discharge end portion of the extrusion die to substantially set the tubing prior to leaving the extrusion die.

5. In plastic tubing forming apparatus, means for extruding material in thermoplastic form including a hollow extrusion die having an elongated cylindrical extrusion passage, means for directing streams of coolant against the interior of the hollow extrusion die for cooling the discharge end portion of the extrusion die to substantially set the tubing prior to leaving the extrusion die.

6. In plastic tubing forming apparatus, means for extruding material in thermoplastic form including a hollow extrusion die having an elongated cylindrical extrusion passage, means for directing streams of coolant against the interior and exterior of the elongated extrusion die for cooling the discharge end portion of the extrusion die to substantially set the tubing prior to leaving the extrusion die, means at the exit of the extrusion die for cleanly shearing the extruded tubing into sections, and means for receiving the sheared sections of tubing and arranged to convey the tubing sections away from the extrusion point for further cooling.

7. In combination in a plastic tubing extruder, means including a thermoplastic material plasticizing chamber having a drive screw operating therein, an extrusion die receiving the thermoplastic material from said chamber as impelled by said screw, said die having an elongated tube-forming passage, said passage including a radiator section and an extrusion orifice, and means for positively cooling said radiator section to the setting temperature of the plastic material so that the material will be extruded in substantially set condition, said cooling means comprising a coolant spray ring encircling said radiator section.

8. In combination in a plastic tubing extruder, means including a thermoplastic material plasticizing chamber having a drive screw operating therein, an extrusion die receiving the thermoplastic material from said chamber as impelled by said screw, said die having an elongated tube-forming passage, said passage including a radiator section and an extrusion orifice, and means for positively cooling said radiator section to the setting temperature of the plastic material so that the material will be extruded in substantially set condition, said cooling means comprising a spray head projecting sprays of coolant internally of said radiator section.

9. In combination in a plastic tubing extruder, means including a thermoplastic material plasticizing chamber having a drive screw operating therein, an extrusion die receiving the thermoplastic material from said chamber as impelled by said screw, said die having an elongated tube-forming passage, said passage including a radiator section and extrusion orifice, and means for positively cooling said radiator section to the setting temperature of the plastic material so that the material will be extruded in substantially set condition, said radiator section being internally hollow, and said cooling means comprising an encircling spray ring and an internal spray head for directing coolant fluid against the radiator section both internally and externally.

10. In combination in a plastic tubing extruder, a cylindrical thermoplasticizing chamber, means operating in said chamber for mixing and driving thermoplastic material toward a discharge outlet, a forming spider mounted at said outlet and having a plastic tube forming preliminary passageway of progressively diminishing wall thickness therethrough, said spider including a downwardly opening hollow core portion projecting therebeyond, a forming die member encircling said projecting core portion, means supporting said encircling die member fixedly, and means for directing coolant spray into said hollow core portion.

11. In combination in a plastic tubing extruder, a pair of cylindrical telescoped members of differential diameter providing opposing tube wall forming die surfaces, said members being coterminus and defining a tube extrusion port, and cut-off means carried by the outer of said members and comprising a series of synchronously operable cut-off knives coordinated to intersect predetermined overlapping arcs of an extruded plastic tube wall, the coterminus extrusion port ends of said members cooperating as stationary shear elements across both of which said knives sweep in shearing relation to sever a length of extruded tubing.

12. In combination in a thermoplastic tube forming apparatus, a downwardly directed plastic tube extruder including an internally hollow downwardly opening extrusion die, an upwardly projecting coolant supply pipe standard having a spray head at the upper end thereof located in spaced relation below said die and arranged to discharge coolant spray into said hollow die member, and means for severing a section of extruded tubing to drop downwardly about said standard.

13. In combination in a plastic tube forming apparatus, a downwardly directed plastic tube extruder including an internally hollow downwardly opening extrusion die, an upwardly projecting coolant supply pipe standard having a spray head at the upper end thereof located in spaced relation below said die and arranged to discharge coolant spray into said hollow die member, means for severing a section of extruded tubing to drop downwardly about said standard, and a turntable supporting said standard and carrying a succession of similar coolant supply standards for successive registration with said tube-forming die to receive a succession of formed plastic tube sections.

14. In combination in a plastic tube forming apparatus, a downwardly directed plastic tube extruder including an internally hollow downwardly opening extrusion die, an upwardly projecting coolant supply pipe standard having a spray head at the upper end thereof located in spaced relation below said die and arranged to discharge coolant spray into said hollow die member, means for severing a section of extruded tubing to drop downwardly about said standard, a turntable supporting said standard and carrying a succession of similar coolant supply standards for successive registration with said tube-forming die to receive a succession of formed plastic tube sections, and means for controlling the supply of coolant to each of the coolant supply standards for discharge therefrom only when in registration with said plastic tube forming die.

15. In combination in a plastic tubing extruder, a pair of cylindrical telescoped members of differential diameter providing opposing tube wall forming die surfaces, said members being coterminus and defining a tube extrusion port, and cut-off means comprising a carrying flange mounted on the outer of said members and supporting a plurality of equally spaced knife blades coordinated in rotary operative cut-off cooperation to intersect predetermined overlapping arcs of a plastic tube wall extruded from between said members, the coterminus extrusion port ends of said members cooperating as stationary shear elements with said knife blades, said knife blades each having a shaft carrying a spur gear and ring gear of larger diameter than said outer member meshing drivingly with said spur gears to effect simultaneous rotation of the knife blades, said knife blades coacting with each other and with both of said ends of said members simultaneously to sever the plastic tube wall uniformly throughout its circumference.

16. In apparatus wherein tubing is formed from plastic material by downward extrusion into sections of substantial length in self-sustaining condition, a conveyor structure including a movable member controlled to move progressively under a tubing extruder to receive on successive portions thereof upstanding respective lengths of the tubing, means for driving said conveyor member, and respective upstanding standards at each of said conveyor portions down over which each of the tubing sections as formed is adapted to descend until the lower end of each of the tubing sections engages the conveyor member with one of the standards extending up inside of the tubing section to support the tubing section against tipping off of the conveyor member until the tubing sections have been conveyed away from the extruder for removal from the conveyor.

17. In apparatus of the character described, wherein plastic tubing is extruded from a nozzle, a cutter mechanism comprising a radially outwardly extending annular supporting flange structure arranged to be supported externally of the nozzle adjacent to the extrusion end of the nozzle, a plurality of elongated cutter knives, each of said knives being supported adjacent to one end by a shaft rotatably supported by said flange structure for swinging of the knives in intersecting arcs with respect to each other and to the extrusion end of the nozzle for severing extruded tubing into sections upon extrusion from the nozzle, each of said shafts having a spur gear thereon, and a ring gear meshing with said spur gears for rotating the spur gears simultaneously for synchronous operation of the knives and having means for driving engagement by driving means.

18. In apparatus of the character described, wherein plastic tubing is extruded from a nozzle, a cutter mechanism comprising a radially outwardly extending annular supporting flange structure arranged to be supported externally of the nozzle adjacent to the extrusion end of the nozzle, a plurality of elongated cutter knives, each of said knives being supported adjacent to one end by a shaft rotatably supported by said flange structure for swinging of the knives in intersecting arcs with respect to each other and to the extrusion end of the nozzle for severing extruded tubing into sections upon extrusion from the nozzle, each of said shafts having a spur gear thereon, and a ring gear meshing with said spur gears for rotating the spur gears simultaneously for synchronous operation of the knives and having means for driving engagement by driving means, said flange structure having a series of openings therethrough for drainage of coolant running down the nozzle onto the flange structure.

GEORGE ALBERT LYON.

REFERENCES CITED

The following references are of record in the file of this patent:

UNITED STATES PATENTS

| Number | Name | Date |
|---|---|---|
| 272,727 | Lyle | Feb. 20, 1883 |
| 515,564 | Weissenborn | Feb. 27, 1894 |
| 1,603,325 | Davidson et al. | Oct. 19, 1926 |
| 1,814,819 | Boswell | July 14, 1931 |
| 2,384,521 | Andersen et al. | Sept. 11, 1945 |
| 2,400,055 | Wallace | May 7, 1946 |